United States Patent
Hayashida et al.

[11] 3,751,916
[45] Aug. 14, 1973

[54] EXHAUST GAS PURIFYING SYSTEM FOR USE IN INTERNAL COMBUSTION ENGINE

[75] Inventors: Motoyuki Hayashida, Hironobu Inoue, Kuniyuki Toyama, all of Hiroshima, Japan

[73] Assignee: Toyo Kogyo Co., Ltd., Hiroshima-ken, Japan

[22] Filed: Dec. 29, 1971

[21] Appl. No.: 213,565

[30] Foreign Application Priority Data
Dec. 29, 1970  Japan............................ 45/135555

[52] U.S. Cl............... 60/289, 60/290, 60/298, 123/119 DB, 123/124 B, 123/97 B
[51] Int. Cl............................................ F02b 75/10
[58] Field of Search................. 60/289, 290, 294, 60/298; 123/119 D, 119 DB, 124 R, 124 B, 97 B

[56] References Cited
UNITED STATES PATENTS
| | | |
|---|---|---|
| 3,364,909 | 1/1968 | Mick.................................... 60/900 |
| 3,374,991 | 3/1968 | Walker.......................... 123/119 DB |
| 3,577,966 | 5/1971 | Collingwood.................. 123/124 B |
| 3,626,915 | 12/1971 | Nakajima...................... 123/119 D |
| 3,670,496 | 6/1972 | Nakajima............................. 60/288 |
| 2,107,874 | 2/1938 | Parvin.............................. 123/97 B |
| 3,251,352 | 5/1966 | Walker............................. 123/97 B |

FOREIGN PATENTS OR APPLICATIONS
1,185,644  3/1970  Great Britain.................... 123/97 B Primary Examiner—Douglas Hart
Attorney—Craig, Antonelli & Hill

[57] ABSTRACT

An exhaust gas purifying system for use in an automobile internal combustion engine which comprises a primary air supply device, a secondary air supply device and a switching device for switching the operation of either or both of said primary and secondary air supply devices in response to the operating conditions of the internal combustion engine, whereby the substantial elimination of abnormal combustion occurring in the exhaust system and the emission of the noxious unburned compounds present in the exhaust gas can be advantageously ensured.

7 Claims, 1 Drawing Figure

Patented Aug. 14, 1973 3,751,916
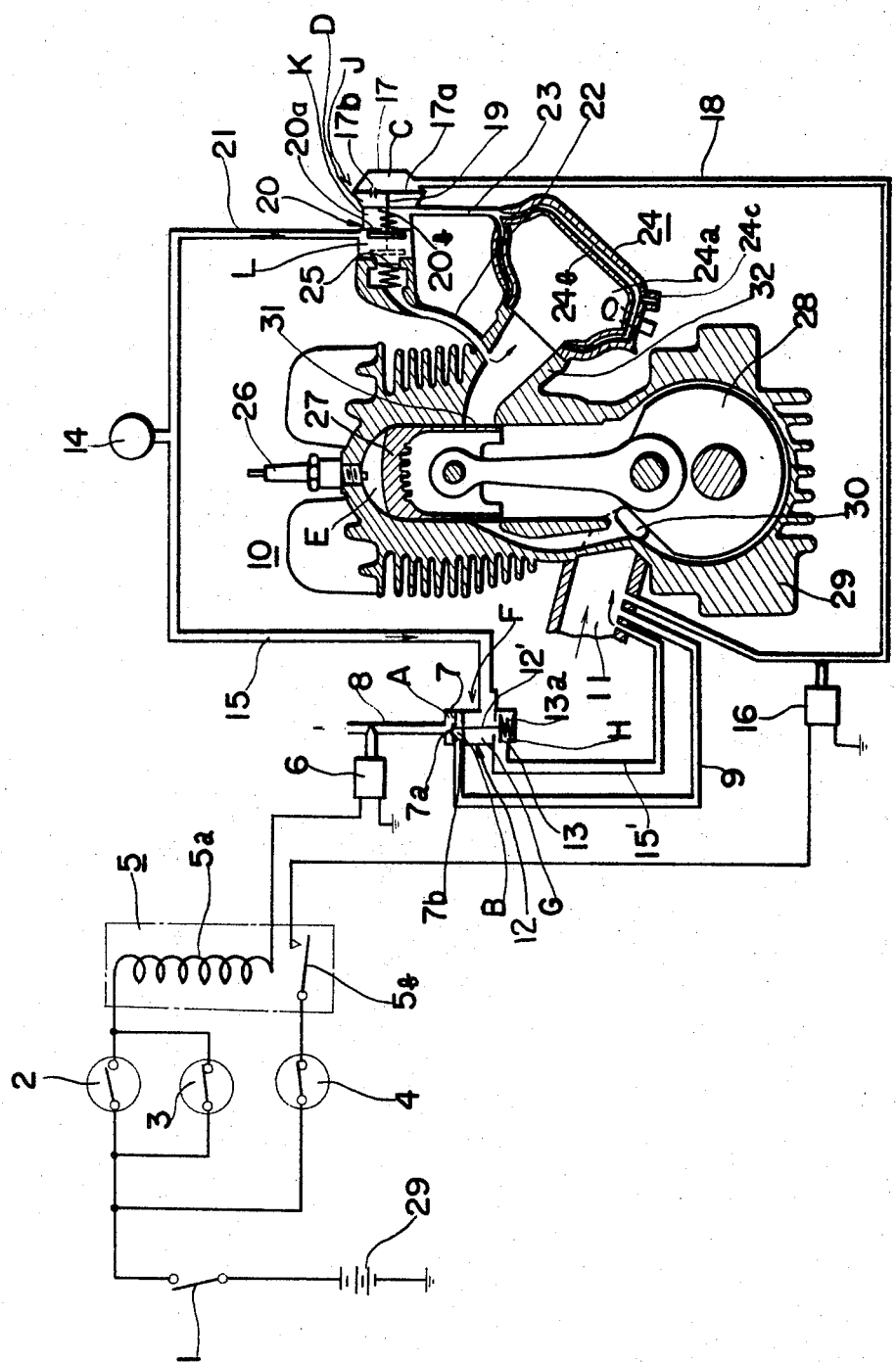

EXHAUST GAS PURIFYING SYSTEM FOR USE IN INTERNAL COMBUSTION ENGINE

The present invention relates to an exhaust gas purifying system for use in an automobile internal combustion engine and, more particularly, to an exhaust system of this kind which comprises a combination of a primary air supply device for introducing fresh primary air, independent of the primary air passing through the carburetor, into the intake system of the engine and a secondary air supply device for introducing secondary air into a thermal reactor or afterburner.

More specifically, the present invention pertains to an exhaust gas purifying system of the above type designed to be operable in response to engine operating conditions and/or the positioning of the throttle valve for reducing or substantially eliminating the emission of noxious unburned compounds present in the automobile exhaust gas concurrently for preventing abnormal combustion from occurring in the exhaust system of the engine under certain engine operating conditions.

Various methods have been heretofore proposed to eliminate the emission of the noxious unburned compounds present in the exhaust gas in such a way as to supply secondary air into the exhaust system of the engine to effect a recombustion of the unburned compounds of the exhaust gas. Various methods have been also proposed to prevent abnormal combustion from occurring in the exhaust system of the engine in such a way as to supply primary air, independent of the primary air passing through the carburetor, into the intake system of the engine to dilute the fuel-air mixture flowing therethrough during the deceleration of the engine.

In order to achieve the purification of the exhaust gas and concurrently the prevention of the occurrence of abnormal combustion in the exhaust system, both the primary air supply device and the secondary air supply device should be mounted in proximity to the automobile internal combustion engine.

In any event, in conventional exhaust gas purifying systems in which the primary air supply device is provided for introducing primary air, independent of the primary air passing through the carburetor, into the intake system of the engine in response to the positioning of the throttle valve and/or the rotation of the engine, there can be found a disadvantage in that, when an ignition switch has been switched off to stop the engine, the fuel-air mixture which has been left unburned within the engine combustion chamber emits through an exhaust port of the engine body and subsequently undergoes a combustion about the exhaust port by the effect of the relatively higher temperature existing at the exhaust port, resulting in that abnormal combustion takes place in the exhaust system of the engine.

Accordingly, an important object of the present invention is to provide an exhaust gas purifying system constructed such that, when the engine is decelerated or after the engine has been stopped, only primary air can be supplied to the intake system thereby permitting the fuel-air mixture to be diluted for the purpose of preventing the occurrence of the undesirable abnormal combustion in the exhaust system which may oftentimes occur during such period.

An object of the present invention is to provide an exhaust gas purifying system comprising a combination of the abovementioned two devices for reducing or substantially eliminating the emission of noxious unburned compounds contained in the exhaust gas and concurrently preventing the occurrence of undesirable abnormal combustion in the exhaust system during certain engine operating conditions without any reduction of the engine performance.

Another object of the present invention is to provide an exhaust gas purifying system of the above type wherein a shell enclosing the afterburner can also be forcibly cooled to improve the durability of the afterburner especially during the high speed operation.

A further object of the present invention is to provide an exhaust gas purifying system of the above type which can be manufactured within a minimum number of components and parts whereby the manufacturing cost can be advantageously reduced without requiring a relatively larger area of space in the engine room for accommodating therein the exhaust gas purifying system.

According to the present invention, the exhaust gas purifying system is designed such that the primary air can be additionally supplied into the engine combustion chamber during the deceleration of the engine and during the opening or switched-off condition of an ignition switch; the secondary air can be supplied into the exhaust system or the afterburner during the acceleration and the normal speed operation, and the secondary air can be supplied around the afterburner to cool the latter during the high speed operation.

These and other objects and features of the present invention will become apparent from the following description taken in conjunction with a preferred embodiment for the purpose of illustration thereof with reference to the accompanying drawing of the FIGURE in which an exhaust gas purifying system of the present invention is schematically shown with the engine shown in lognitudinal side section.

Before reference is made to the accompanying drawing, it is to be noted that, although the present invention is applicable to various types of spark ignition internal combustion engine with no substantial modification, the engine shown for the sole purpose of illustration of the present invention is employed in the form of a two-cycle engine of known construction.

The engine 10 so far shown includes a housing structure 29 having therein a keyhole-shaped cavity in which a crankshaft 28, a connecting rod and a piston 27 are operatively accommodated. This housing structure 29 is formed with a spark plug 26 having one end situated outside the housing structure 29 and the other end oriented toward a combustion chamber E defined between the inner surface of the housing structure 29 and the top surface of the piston 27. This engine housing structure 29 is also formed with an intake port 30 connected with one end of an intake passage 11 having the other end connected with a suitable air source (not shown) through a carburetor (not shown) and an exhaust port 31 connected with one end of an exhaust passage 32 having the other end connected with the atmosphere through an afterburner 24. The afterburner 24 is preferably of the type having a working chamber 24a and an air jacket 24b surrounding said working chamber 24a, substantially as described in the pending U.S. Pat. applications respectively filed on June 9, 1970 and July 23, 1971 under Ser. Nos. 44,847 and 165,463, both of which were assigned to the same assignee of the present application.

A primary air supply device for additionally supplying primary air from an air source (not shown) into the intake passage 11 includes a main passage 15 having one end connected with a common air pump 14 and the other end connected as will be mentioned later. This primary air supply device further includes a primary air flow control valve assembly F comprising a diaphragm valve 7 formed with a pair of first and second working chambers A and B partitioned by a diaphragm member 7a having a balance hole 7b formed therein, and a control valve 12 having a pair of first and second working chambers G and H. The other end of the main passage 15 is connected with said first working chamber G of the control valve 12 and the other working chamber H of said control valve 12 is connected with the intake passage 11 by means of a conduit 15'.

The diaphragm valve 7 is designed such that the first working chamber A is communicated with the atmosphere through a solenoid valve 6 by means of a conduit 8 and the other working chamber B is connected with the intake passage 11 by means of a conduit 9. The control valve 12 is operatively associated with the diaphragm valve 7 by means of an operating rod 12' having one end secured to the diaphragm member 7a and the other end connected with a valve member 13 normally urged by a suitable spring member 13a so as to discommunicate between the first and second working chambers G and H of the control valve 12.

The solenoid valve 6 has a solenoid coil (not shown) having one end grounded and the other end connected with the adjacent end of a relay coil 5a of a relay switch assembly 5, the other end of said relay coil 5a being connected with a positive terminal of a battery power source 29 through parallely disposed idle switch 2 and low speed switch 3 and then an ignition switch 1. This solenoid valve 6 can be operated, when both of the switches 2 and 3 are opened as will be mentioned later, so as to permit the communication between the first working chamber A of the diaphragm valve 7 and the atmosphere and, when either or both the switches 2 and 3 are closed, to discommunicate between said working chamber A and the atmosphere.

The control valve 12 which is normally in position to discommunicate between the passage 15 or the first working chamber G and the conduit 15' or the second working chamber H by means of the valve member 13 can be operated so as to communicate therebetween when the diaphragm member 7a is displaced toward the working chamber B, namely, when the negative pressure present in the intake passage 11 becomes of a relatively higher value sufficient to overcome the resiliency of the spring 13a.

The idle switch 2 is operatively associated with a throttle valve (not shown) disposed in the intake passage 11 in such a way as to open during the idling operation in which condition the throttle valve is usually substantially closed and to close when the throttle valve is opened. It is to be noted that this idle switch 2 may be designed such as to operate in response to the pressure present in the intake passage 11.

The low speed switch 3 is designed such as to close when the engine speed is smaller than a predetermined value, for example, 1,500 r.p.m. and to open when the engine speed exceeds the predetermined value of 1,500 r.p.m. This low speed switch 3 may be operatively associated with a power output shaft of the engine 10.

The secondary air supply device for alternately supplying second air into the exhaust passage 32 and the air jacket 24b of the afterburner 24 includes a passage 21 having one end connected with the common air pump 14 and the other end connected as will be mentioned later. This secondary air supply device further includes a secondary air flow control valve assembly J comprising a diaphragm valve 17 formed with a pair of first and second working chambers C and D partitioned by a diaphragm member 17a having a balance hole 17b therein, and a control valve 20 having a pair of first and second working chambers K and L. The other end of the passage 21 is connected with said second working chamber L of said control valve 20 which is in turn connected with the exhaust passage 32 through a check valve 25 of known constructions which is employed to prevent the backflow of exhaust gas from the exhaust passage 32 to the second working chamber L of the control valve 20.

The diaphragm valve 17 is designed such that the first working chamber C is communicated with the intake passage 11 through a solenoid valve 16 by means of a conduit 18 and the second working chamber D is communicated with said first working chamber C through the balance hole 17b. The control valve 20 is operatively associated with the diaphragm valve 17 by means of an operating rod 19 having one end secured to the diaphragm member 17a and the other end connected with a valve member 20a normally urged by a suitable spring member 20b through the operating rod 19 so as to communicate between the first working chamber K, which is communicated with the air jacket 24b of the afterburner 24 through a conduit 23, and the second working chamber L which is communicated with the passage 21 as hereinbefore described.

The solenoid valve 16 disposed on the passage 18 has a solenoid coil (not shown) having one end grounded and the other end connected with the ignition switch 1 through a relay switch 5b of the relay assembly 5 and then a high speed switch 4, said relay switch 5b being adapted to be closed upon excitation of the relay coil 5a. This solenoid valve 16 can be operated, when the both switches 4 and 5b are closed as will be mentioned later, so as to permit the communication between the intake passage 11 and the first working chamber C of the diaphragm valve 17 and to discommunicate therebetween when either of said switches 4 and 5b is opened.

The high speed switch 4 is designed such as to close when the engine speed is smaller than a predetermined value, for example, 4,000 r.p.m. and to open when the engine speed exceeds the predetermined value of 4,000 r.p.m. This high speed switch 4 may be operatively associated with the power output shaft of the engine 10 in a similar way to the low speed switch 3.

The control valve 20 which is normally in position to communicate between the passage 21 and the passage 23 therethrough can be operated so as to discommunicate therebetween when the diaphragm member 17a is displaced toward the first working chamber C causing the valve member 20a to move against the spring 20b in the same direction as the diaphragm member 17a is displaced. This mode of operation can be effected when the solenoid valve 16 is in position to establish the communication between the intake passage 11 and the first working chamber C of the diaphragm valve 17. At this time, air that has been supplied to the working chamber L through the passage 21 can flow into the exhaust passage 32 by means of the conduit 22 through the check valve 25. However, unless otherwise the negative pressure in the intake passage 11 does work on the first working chamber C of the diaphragm valve 17 in such a way as hereinbefore described, the air flowing from the air pump 14 by means of the passage 21 can flow through the control valve 20, passing through the air jacket 24b of the afterburner 24 and then to the atmosphere.

While the construction of the exhaust gas purifying system of the present invention is such as described hereinabove, the operation thereof will be hereinafter described.

I. During the Idling Operation

During this period, the main switch 1 and both the low speed and high speed switches 3 and 4 are closed while the idle switch 2 is opened. Accordingly, the first solenoid valve 6 is conditioned to discommunicate between the first working chamber A of the diaphragm valve 7 and the atmosphere and the second solenoid valve 16 is, because the relay switch 5b is closed by the excitation of the relay coil 5a, conditioned to permit the communication between the intake passage 11 and the first working chamber C of the diaphragm valve 17 of the secondary air supply device so that the pressure in said working chamber C can be equalized to the negative pressure in the intake passage 11.

As the first solenoid valve 6 is conditioned as hereinbefore described, the negative pressure in the intake passage 11 acts on the second working chamber B of the diaphragm valve 7 thereby to equalize the pressure in said chamber B to the negative pressure in the intake passage 11 and, on the other hand, the first working chamber A is also equalized in pressure to that in the working chamber B because of the balance hole 7b communicating between said two working chambers A and B, whereby the valve member 13 of the control valve F can be maintained in the position to discommunicate between the main passage 15 and the conduit 15'. Accordingly, it is clear that no primary air can be supplied to the intake passage 11 through the primary air supply device during this period.

However, as the pressure in the first working chamber C of the diaphragm valve 17 of the secondary air supply device J is equalized to the negative pressure in the intake passage 11 upon opening of the solenoid valve 16, the diaphragm member 17a can be displaced in the direction of the first working chamber C to move the operating rod 19 of the control valve 20 so that the communication between the passage 21 and the conduit 23 can be cut off while secondary air from the air pump 14 can be permitted to flow into the afterburner 24 through the exhaust passage 32 by means of the conduit 22, the secondary air thus supplied to the afterburner 24 being utilized to effect a recombustion of unburned noxious gas present in the exhaust gas within the afterburner 24 thereby to substantially eliminate the unburned noxious compounds.

II. During the Acceleration or Normal Operating Condition

During this period, the operation of the exhaust gas purifying system of the present invention is substantially as afforded during the idling of the engine 10. However, it is to be noted that, during this period, the low speed switch 3 is opened while the other switches 1, 2 and 4 are closed.

III. During High Speed Operating Condition

During this period, the ignition switch 1 and the idle switch 2 are closed while the low speed and high speed switches 3 and 4 are opened. Accordingly, the first solenoid valve 6 is conditioned to discommunicate between the first working chamber A of the diaphragm valve 7 and the atmosphere and, by the reasons as hereinbefore described in the items I and II, no primary air can be supplied into the intake passage 11. On the other hand, the second solenoid valve 16 is conditioned to discommunicate between the intake passage 11 and the first working chamber C of the diaphragm valve 17 so that the communication between the passage 21 and the passage 23 can be established with the valve member 20a of the control valve assembly J being urged by the spring 20b so as to discommunicate between the passage 21 and the conduit 22. Thus, it is clear that the secondary air supplied from the air pump 14 can be in turn supplied to the air jacket 24b so that the afterburner 24 can be forcibly cooled thereby to prevent said afterburner 24 from being overheated. This brings about an advantage that the durability of the afterburner 24 which may be reduced if said afterburner is continuously exposed to the relatively higher temperature can be improved.

IV. During the Decleration

During this period, the ignition switch 1 and the high speed switch 4 are closed while the idle switch 2 and the low speed switch 3 are opened. Accordingly, the first solenoid valve 6 is at this time conditioned to communicate between the first working chamber A of the diaphragm valve 7 and the atmosphere while the second solenoid valve 16 is conditioned to discommunicate between the first working chamber C of the diaphragm valve 17 and the intake passage 11.

In this condition, the pressure in the first working chamber A of the diaphragm valve 7 can be equalized to the atmospheric pressure upon opening of the passage 8 while the pressure in the second working chamber B of said diaphragm valve 7 can be maintained at a value substantially equal to the negative pressure in the intake passage 11, whereby the valve member 13 can be moved by the effect of pressure differential between said first and second working chambers A and B so as to communicate between the first and second working chambers G and H of the control valve F, thereby permitting the primary air to be supplied into the intake passage 11 therethrough from the air pump 14. The primary air thus supplied into the intake passage 11 can be utilized to dilute the fuel-air mixture that has been supplied into the engine combustion chamber E, thereby to prevent the abnormal combustion from occurring in the exhaust system of the engine which may oftentimes occur during the deceleration.

On the other hand, as the flow of air in the passage 18 is cut off by the solenoid valve 16, the secondary air that has been supplied from the air pump 14 through the passage 21 can be fed to the air jacket 24b of the afterburner 24 by means of the conduit 23 and finally exhausted to the atmosphere through an outlet port 24c after heat-exchange has been effected in the air jacket 24b. Thus, the afterburner 24 that has a tendency to be heated to a relatively higher temperature can be forcibly cooled without hampering the recombustion of the unburned noxious compounds within the afterburner 24.

V. During the Engine Inoperative Condition

When the engine 10 is not running or stopped, the ignition switch 1 is usually switched off as has been largely practiced. Under this condition, the first and second solenoid valves 6 and 16 are respectively brought into the inoperative conditions so that the conduit 8 and the passage 18 are respectively opened and closed. Accordingly, only the control valve F can be conditioned to permit the flow of the primary air from the air pump 14 to the intake passage 11 therethrough by the effect of negative pressure still existing so long as the engine undergoes an inertia rotation, so that the occurrence of the abnormal combustion in the exhaust system which oftentimes takes place during this period by the effect of the temperature from the exhaust port 31 or therearound can be advantageously prevented.

From the foregoing description, it is clear that the present invention is designed such as to combine the primary and secondary air supply devices permitting the reasonable distribution of air to be supplied to the engine, said distribution being effected in response to the engine operating conditions. Accordingly, not only the exhaust purifying system can be manufactured in a simplified construction, the substantial elimination of both of the abnormal combustion occurring in the exhaust system and the emission of unburned noxious compounds can be advantageously ensured. In addition, especially during the high speed operation, the afterburner 24 can be advantageously forcibly cooled as hereinbefore described.

Although the present invention has been fully described by way of example in conjunction with a preferred embodiment, it is to be noted that various changes and modifications are apparent to those skilled in the art, such changes and modifications being to be construed as included within the scope of the present invention unless otherwise departing therefrom.

We claim:

1. An exhaust gas purifying system for use in an automobile internal combustion engine comprising a spark plug ignition system including at least one spark plug, a power source and an ignition switch, for effecting a combustion of fuel-air mixture that has been supplied to a combustion chamber of the engine through a carburetor having a throttle valve and disposed on an intake passage of said engine, the exhaust gas purifying system comprising an air supply means disposed on the connection between a suitable air source and the intake passage for supplying primary air to the intake passage, means for detecting the deceleration and stoppage of the engine and for opening said air supply means when the engine is decelerated and stopped, said detecting means including a first switch and a second switch parallely diposed with respect to said first switch, both said first and second switches being connected in series between said ignition switch and said air supply means for operating the latter in response to the engine operating conditions, said first switch being adapted to be opened during the substantial closure of said throttle valve and said second switch being adapted to be closed only when the engine speed is smaller than a predetermined value, wherein, when the engine is decelerated with the engine speed exceeding over said predetermined value during the substantial closure of said throttle valve, both said first and second switches are opened to permit the air supply means to supply the primary air to the intake passage and, even though said ignition switch is turned off, the supply of the primary air to the intake passage can be effected.

2. An exhaust gas purifying system for use in an automobile internal combustion engine comprising a spark plug ignition system including at least one spark plug, a power source and an ignition switch, for effecting a combustion of fuel-air mixture that has been supplied to a combustion chamber of the engine through a carburetor having a throttle valve and disposed on an intake passage of said engine, the exhaust gas purifying system which comprises a diaphragm valve having a diaphragm member and a pair of working chambers partitioned by said diaphragm member, a first one of said working chamber of said diaphragm valve being connected to the atmosphere through a suitable passage and the other second working chamber thereof being connected with the intake passage of the engine, an air flow control valve disposed on the connection between a suitable air source and the intake passage and operatively associated with said diaphragm valve, a solenoid valve disposed on said passage connecting between the first working chamber of the diaphragm valve and the atmosphere, and means including first and second switches parallely disposed with respect to each other and series disposed between said ignition switch and said solenoid valve for operating said solenoid valve, said first switch adapted to be opened during the idling and deceleration of the engine and said second switch adapted to be closed only when the engine speed is smaller than a predetermined value, said solenoid valve being closed in response to the closure of either of said first and second switches to close said passage connecting between the first working chamber of the diaphragm valve and the atmosphere, whereby no primary air can be additionally supplied into the intake passage through said air flow control valve, in which condition said air control valve being maintained by said diaphragm valve in position to cut off the connection between the air source and the intake passage.

3. An exhaust gas purifying system as claimed in claim 2, wherein said air flow control valve is normally maintained in position to cut off the connection between the air source and the intake passage, but to open said connection only when said solenoid valve is in position to permit the communication between the first working chamber of the diaphragm valve and the atmosphere.

4. An exhaust gas purifying system as claimed in claim 2, wherein said predetermined value at which said second switch is closed is 1,500 r.p.m.

5. An exhaust gas purifying system as claimed in claim 2, wherein said first switch is operatively associated with the throttle valve in such a way as to open upon the substantial closure of said throttle valve and to close upon opening of said throttle valve.

6. An exhaust gas purifying system for use in an automobile internal combustion engine comprising a spark plug ignition system including at least one spark plug, a power source and an ignition switch, for effecting a combustion of fuel-air mixture that has been supplied to a combustion chamber of the engine through a carburetor having a throttle valve and disposed on an intake passage of said engine, the exhaust gas purifying system which comprises a first diaphragm valve having a diaphragm member and a pair of working chambers partitioned by said diaphragm member, a first one of said working chamber of said first diaphragm valve being connected to the atmosphere through a suitable passage and the other second working chamber thereof being connected with the intake passage of the engine, a first air flow control valve disposed on the connection between a suitable air source and the intake passage and operatively associated with said first diaphragm valve, a first solenoid valve disposed on said passage connecting between the first working chamber of the first diaphragm valve and the atmosphere, means including parallely disposed first and second switches which are disposed in series between said ignition switch and said first solenoid valve, a relay assembly having a relay coil inserted between the parallely disposed first and second switches and said first solenoid valve and a relay switch, said first switch adapted to be opened during the idling deceleration of the engine and said second switch adapted to be closed only when the engine speed is smaller than a first predetermined value, said solenoid valve being closed in response to the closure of either of said first and second switches to close said passage connecting between the first working chamber of said first diaphragm valve and the atmosphere, a second diaphragm valve having a pair of first and second working chambers partitioned by a diaphragm member, one of said working chambers being connected with the intake passage through a suitable passage, a second air flow control valve having a pair of first and scond working chambers, a first one of said working chambers thereof being connected with an exhaust passage of the engine through a check valve, capable of permitting the flow of air from said first working chamber to said exhaust passage, and the other second working chamber of said second air flow control valve being connected with the atmosphere through an air jacket formed around an exhaust gas purifying device disposed on said exhaust passage for effecting a recombustion of unburned noxious compounds present in the exhaust gas, a second solenoid valve disposed on the connection between the intake passage and the first working chamber of said second diaphragm valve, and said means further including a third switch adapted to be closed, when the engine speed is smaller than a second predetermined value, for bringing said second solenoid valve in position to open said connection between said intake passage and the first working chamber of said second diaphragm valve, whereby, during the idling, the acceleration and the normal operating condition of the engine while the ignition switch is switched on, only secondary air can be supplied to the exhaust passage through the second air flow control valve to aid the recombustion of the unburned compounds within the exhaust gas purifying device; during the high speed operation while the ignition switch is switched on, only the secondary air can be supplied to the air jacket to cool the afterburner; during the deceleration of the engine, only primary air can be supplied into the intake passage to prevent abnormal combustion from occurring in the exhaust passage while the secondary air can be supplied to the air jacket through said second air flow control valve; and, so long as the ignition switch is switched off, the flow of the primary air from the air source to the intake passage through the first air flow control valve can be permitted to prevent the occurrence of abnormal combustion in the exhaust passage which may take place by the effect of a relatively high temperature existing at and around the exhaust passage.

7. An exhaust gas purifying system as claimed in claim 6, wherein said second predetermined value is 5,000 r.p.m.

* * * * *

UNITED STATES PATENT OFFICE
CERTIFICATE OF CORRECTION

Patent No. 3,751,916                Dated August 14, 1973

Inventor(s) Motoyuki Hayashida, Hironobu Inoue and Kuniyuki Toyama

It is certified that error appears in the above-identified patent and that said Letters Patent are hereby corrected as shown below:

Line 54, Column 7:

"diposed" should be "disposed"

Signed and sealed this 12th day of March 1974.

(SEAL)
Attest:

EDWARD M. FLETCHER, JR.          C. MARSHALL DANN
Attesting Officer                 Commissioner of Patents